United States Patent [19]

Howell et al.

[11] Patent Number: 4,666,012
[45] Date of Patent: May 19, 1987

[54] PITCH CONTROLLED GROUND EFFECT VEHICLE

[76] Inventors: Murrell D. Howell; Mary E. Howell, both of 20911 Beachwood La., Huntington Beach, Calif. 92646

[21] Appl. No.: 862,221
[22] PCT Filed: Jul. 22, 1985
[86] PCT No.: PCT/US85/01386
§ 371 Date: Apr. 15, 1986
§ 102(e) Date: Apr. 15, 1986
[87] PCT Pub. No.: WO87/00492
PCT Pub. Date: Jan. 29, 1987
[51] Int. Cl.$^4$ .................. B60V 1/06; B60V 1/14; B60V 1/18
[52] U.S. Cl. .................. 180/117; 180/126
[58] Field of Search .............. 180/116, 117, 118, 119, 180/126; 114/67 A

[56] References Cited

U.S. PATENT DOCUMENTS

| 3,078,939 | 2/1963 | Bollum | 180/117 |
| 3,187,817 | 6/1965 | Colley | 180/117 X |
| 3,205,960 | 9/1965 | Sperazz | 180/117 |
| 3,412,956 | 11/1968 | Cockerell | 180/118 X |
| 3,582,520 | 6/1971 | Kirpitznikoff | 180/117 |
| 3,608,662 | 9/1971 | Ferguson | 180/117 |
| 3,968,851 | 7/1976 | Windt | 180/117 |
| 4,313,512 | 2/1982 | Jutras | 180/117 |
| 4,462,560 | 7/1984 | Earl | 180/116 X |

FOREIGN PATENT DOCUMENTS

| 2347244 | 11/1977 | France | 180/117 |
| 1222521 | 2/1971 | United Kingdom | 180/119 |

*Primary Examiner*—John A. Pekar
*Attorney, Agent, or Firm*—Albert O. Cota

[57] ABSTRACT

A vehicle utilizing a pair of counter rotating lift fans (36) driven by an air cooled internal combustion engine (34) provide compressed air into a plenum under a shell (26) moving the vehicle away from the surface upon which it is resting with the gas escape velocity evenly distributed around a peripheral skirt (28). A separate forward thrust fan (68) driven directly by a rotating pedestal mounted engine (56) provide the forward propulsion. An aileron (72) is rotatably mounted directly behind the thrust fan (68) and provides controlled response to the pitch direction of the vehicle by changing the angle of the air flow discharge. The vehicle contains a pair of movable keels (82) for operation on the water and side wings (86) to extend the effective surface of the craft.

17 Claims, 13 Drawing Figures

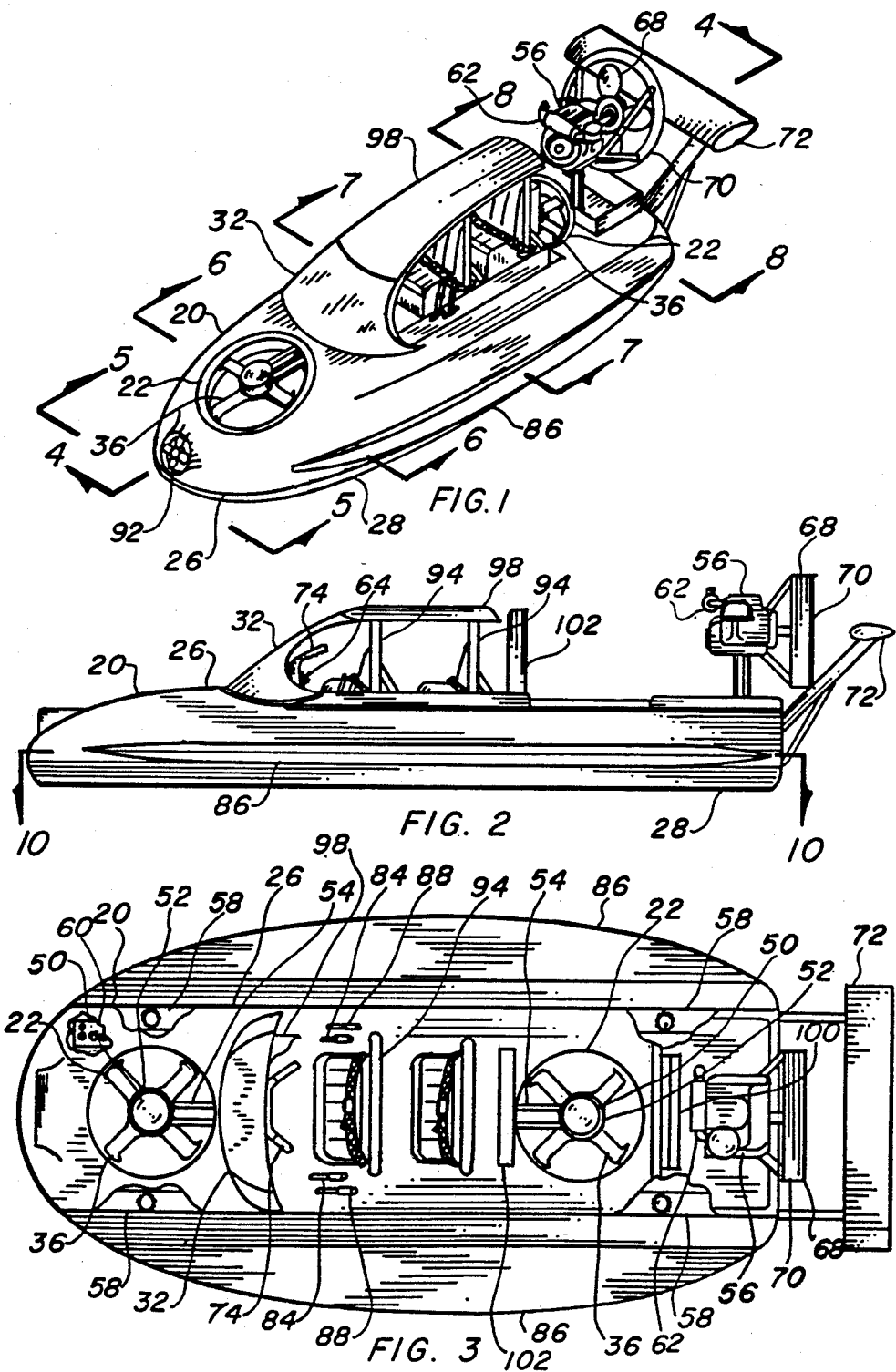

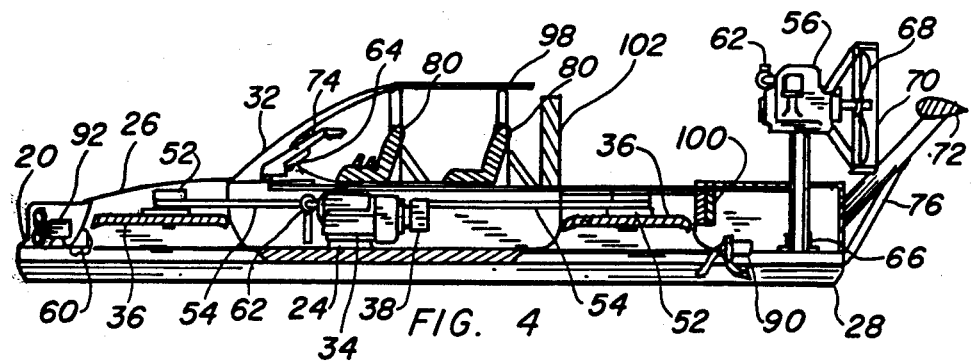
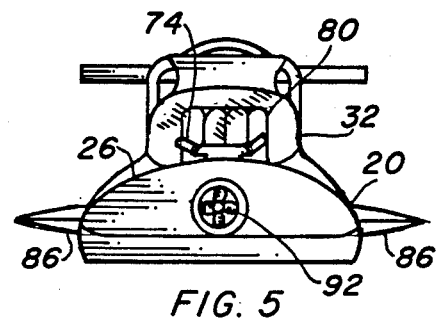
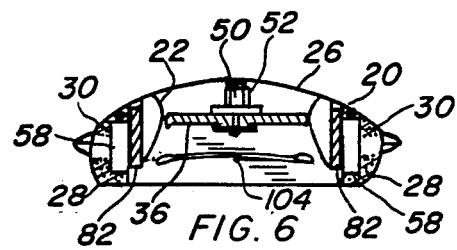
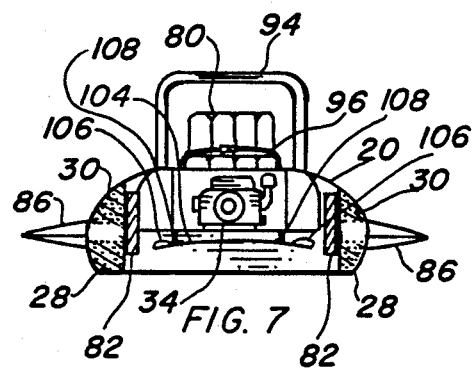
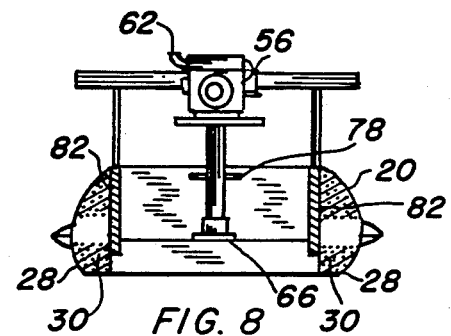
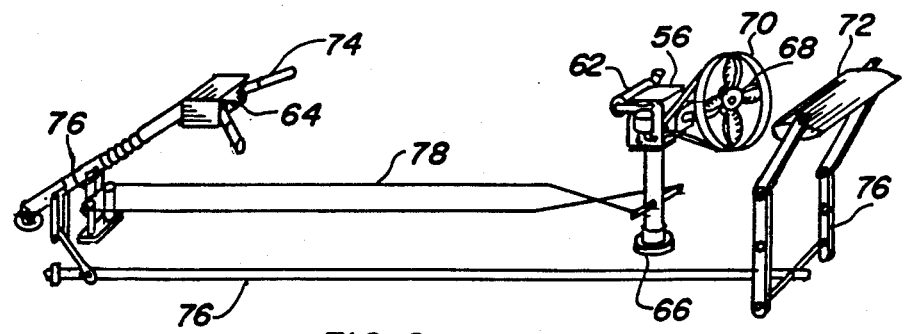

PITCH CONTROLLED GROUND EFFECT VEHICLE

TECHNICAL FIELD

The invention relates to ground effect vehicles operating on a cushion of air in general, and more specifically to a vehicle having pitch controlled by an airfoil behind a thrust fan.

BACKGROUND ART

Previously, many types of vehicles have been in use using the principle of a cushion of air to provide lift from the surface upon which it is operating in conjunction with thrust directed air flow for forward propulsion. In most cases, however, no consideration has been given to the control of the pitch of the vehicle to provide an optimum use of air gap or escape nozzle of the vehicle over an irregular ground surface, and also provisions to maximize the lift potential during operation over water. A search of the prior art did not disclose any patents that read directly on the claims of the instant invention. However, the following U.S. patents were considered related:

| PATENT NO. | INVENTOR | ISSUE DATE |
| --- | --- | --- |
| 3,078,939 | Bollum, Sr. | Feb. 26, 1963 |
| 3,187,817 | Colley | June 8, 1965 |
| 3,412,956 | Cockerell | Nov. 26, 1968 |
| 3,583,520 | Kirpitznikoff | June 8, 1971 |
| 3,968,851 | Windt | July 13, 1976 |

Bollum, Sr. teaches an earth skimming vehicle with a rudder directly behind a screw propeller providing horizontal thrust for driving the vehicle. The rudder is provided for jaw control and is attached by a stationary vertical support on the same plane and aligned fore and aft with the vertical diameter of the propeller shroud ring. Side thrust is provided by an open cylindrical tube having a D.C. motor driven fan supplementing the rudder for steering control.

Colley discloses a power plant for ground effect aircraft and consists of one or more engines which are arranged to supply power for the operation of two separate air moving devices. A power reduction means reduces the supply whenever the speed falls below a predetermined level maintaining constant power supply to the remaining drive.

Cockerell is concerned with stabilizing a vehicle hovering over land or water. This invention provides means for bringing about a stepped pressure distribution over at least part of the cushion when the vehicle is deflected from its intended orientation with a restoring force applied righting the directional orientation.

Kirpitznikoff teaches an air cushion vehicle with the hull formed of two integral sections. The upper part forms the passenger cabin and the lower part is a plenum chamber. The sections are secured together with a flange and a bumper and side wall buoyancy chamber are included around the plenum chamber.

Windt includes a vehicle in which the lift fan and the propulsion unit are driven from the same engine in such a manner as to keep the lift fan at a constant speed and vary the propulsion fan for speed control. The lift fan is driven by two adjustable pulleys, one sensing torque from the lift fan adjusting its effective diameter, the other is regulated by spring force.

DISCLOSURE OF THE INVENTION

Propelling an air cushion or ground effect vehicle over an irregular surface has been difficult in the past as considerable compressed fluid in the form of air driven by a rotating fan is required due to the varying distance from the fixed surface. This invention taken another approach to the problem, instead of simply increasing the air flow, the vehicle itself is controlled in the pitch angle allowing the vehicle to change the distance or air gap in the front or rear of the apparatus. This feature then becomes a primary object of the invention allowing optimum air flow during normal operation and compensating for the irregular surface with the same air flow, however, in a controlled manner. This is accomplished by the use of a movable aileron behind a thrust fan moving the rear of the vehicle up or down upon demand of the operator effectively changing the directional air flow. This aileron also provides stability about the pitch axis during normal operation.

An important object of the invention includes floats suspended by a framework allowing airspace above. This open area assists the lifting force required to support the craft, as the vortex created increases the lifting force in a smaller area. With the combined utilization of airspace and configuration reduction in weight, more lift is accomplished.

Another object of the invention is the versatility of the vehicle operating effectively on land as well as water with components so arranged as to accomplish this feature without modifications or complex adjustments. Further, the device is relatively small adapted to convey two passengers with ease sitting comfortably on top of the structure with a removable canopy on top for protection from adverse weather conditions.

Still another object of the invention includes the use of a motor driven reversing fan installed in the immediate front of the vehicle in direct opposition to the rear thrust fan. This auxillary fan is driven by a direct current motor and applies breaking power when the vehicle is traveling down hill or is coming to a stop. The thrust fan is throttled in speed for this purpose and with the use of this type of air moving device, complete and positive control may be achieved.

Yet another object of the present invention is the addition of a fluid pump located at the bottom rear of the vehicle. This pump is also powered by a direct current motor and ingests water in the inlet and discharges this fluid at a high velocity in the opposite direction. This system allows the craft to be steered in the docking mode while operating upon the surface of the water. As the discharge is directional, the steering capability may be realized, within limitations, and low speeds are dictated by the function.

A final object is directed toward the overall safety of the vehicle. Roll bars and seat belts, or harnesses, are included in case of a collision of a magnitude that would affect the passengers. Further, all of the controls are spring loaded to return the operating motors to the idle position at a low speed in the event the operator removes his hands from the control. The steering mechanism is also spring loaded returning the aileron to a neutral position leveling the craft when direction is lost or removed. Only one engine is utilized for both fans while lifting the craft from the surface, and as such, if power is lost the craft will settle easily. Separate prime movers would have the immediate effect of instability if one is lost or the speed is abruptly altered. A parachute near the aft roll bar insures safety of the passengers in the event the terrain is such that sufficient distance of free fall is possible.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment with the side wings retracted.

FIG. 2 is an elevational view of the preferred embodiment.

FIG. 3 is a plan view of the preferred embodiment.

FIG. 4 is a cross-sectional view of the preferred embodiment taken along lines 4—4 of FIG. 1.

FIG. 5 is a front view of the preferred embodiment.

FIG. 6 is a cross-sectional view taken along lines 6—6 of FIG. 1.

FIG. 7 is a cross-sectional view taken along lines 7—7 of FIG. 1.

FIG. 8 is a cross-sectional view taken along lines 8—8 of FIG. 1.

FIG. 9 is a pictorial diagram of the steering control system in partial isometric representation completely removed from the invention for clarity.

BEST MODE FOR CARRYING OUT THE INVENTION

Figure 10:
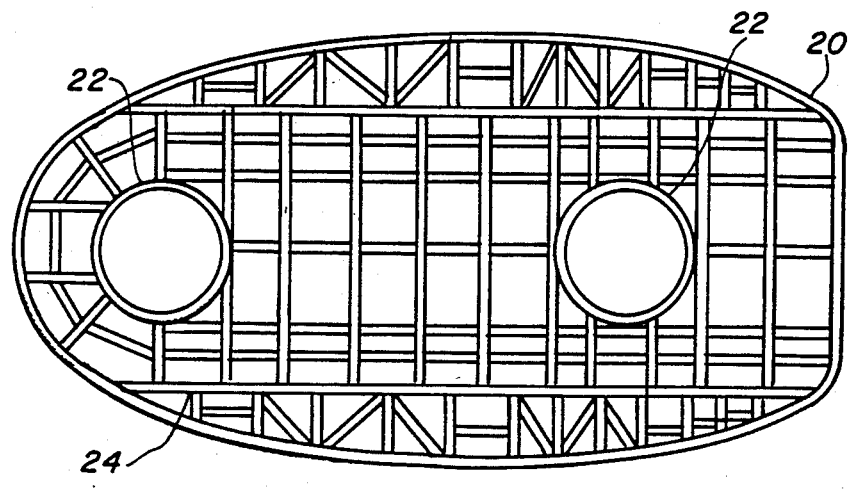
FIG. 10 is a cross-sectional view of the preferred embodiment taken along lines 10—10 of FIG. 2.
Figure 11:
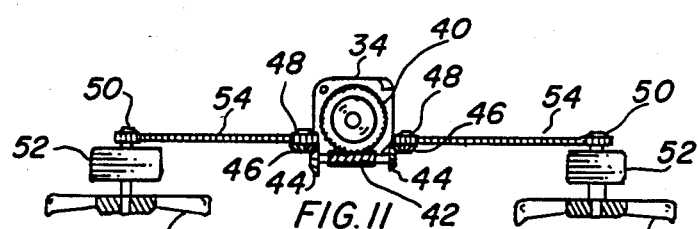
FIG. 11 is an illustration of the drive connection of the thrust engine and the thrust fans completely removed from the invention for clarity.

The best mode for carrying out the invention is presented in the terms of a preferred embodiment that is comprised of a body 20 having an aerodynamic shape, flat on the bottom with a seating portion on the top and a pair of round orifices 22 penetrating completely through on each end. The body 20 consists of a structural frame 24 having sufficient integrity to support the propelling apparatus, along with two or more passengers. The frame 24 may be of any material, such as steel, magnesium, plastic compositions, etc., with aluminum being preferred.

A shell 26 is attached to the frame encompassing the outside area, providing not only the outside protective enclosure, but also incorporating an integral air plenum. This shell 26 is preferably constructed of fiberglass, however, any thermoplastic, or the like, may also provide the necessary structural prerequisites.

A plurality of skirts 28 project downwardly from the shell 26 define an outside peripheral boundary for discharge of air underneath. These skirts may be either attached from the frame 24, or shell 26, and may be constructed of a resilient material that contains sufficient elastic properties to allow irregular objects to deform them or move them aside when the vehicle is being propelled.

On the interior of the vehicle, attached to the frame 24, is a plurality of foam filled float chambers 30. These chambers 30 are preferably, but not mandatorily, filled with one third polyurethane foam on the bottom, one third dead air space in the middle, and the remaining top section foamed, as above. With this combination a greater lifting force for a smaller area may be realized by the overall system. Fiberglass, or the like, encloses the chambers 30, making them completely sealed and watertight.

Finally, the body 20 further contains a windshield 32 in the front of the driver allowing protection from the prevailing ambient conditions while the vehicle is in operation. The windshield 32 is formed of an optically clear thermoplastic material, such as cellulose, acetate, polypropylene, polycarbonate, or acrylic methyl methacrylate.

The prime mover for the vehicle utilizes an internal combustion lift engine 34 installed in the middle of the body 20, including all of the necessary auxillary equipment for operation, such as a fuel tank 58, battery 60, exhaust system 62, and remote switch gear 64. The lift engine 34 is resiliently mounted on a separate pad on the frame 24 and all of the interconnecting wiring, fuel piping, exhaust piping, etc. are routed within the structure. A plurality of fuel tanks 58 are incorporated for additional storage with the necessary crossover switches in the interconnecting lines located at convenient positions providing the operator with manual control. The lift engine 34 is preferably the air cooled type having an internal fan to move air across extended surface areas within the block and heads for dissipating the heat developed by the engine in operation.

A pair of lift fans 36 are positioned within the round orifices 22 in the body 20 and furnish a direct movement of air when rotated from the top of the vehicle to within the plenum chamber of the shell 26. Each fan 36 operates in an opposite direction counter rotating to balance the system and provide additional stability of the craft. The air flow produced by these fans 36 create a lift effect by pushing a pressurized curtain of air underneath the body 20 forcing a separation of the craft from the surface upon which it is resting in an air cushion manner.

The fans 36 are mechanically linked to the lift engine 34 with drive means changing the rotational force of the engine from vertical to horizontal. This is accomplished with a flywheel gear 40 attached directly to the flywheel of the engine 34. A worm gear 42 is rotatably meshed with the flywheel gear 40 and a pair of first bevel gears 44 are attached on each end. This arrangement changes the speed and rotational plane of the engine 34. A set of second bevel gears 46 are meshed into the first gears 44 restoring the operational plane, however, in opposite directions. Directly on top of the second gears are a pair of first sprockets 48 that have teeth extending outwardly. Each fan 36 is mechanically linked to a gear box 52 on one side and a second sprocket 50 on the other. This gear box 52 has internal speed changing capabilities allowing the optimum rotation of each fan 36. The second sprocket 50 is much like the first 48 in that it is planar and has similar extending teeth. A pair of chains 54, metal or plastic, link the first sprocket 48 and second sprocket 50 together, transmitting power from the lift engine 34 to the fans 36. Necessary lubrication means and tensioning means are included in this drive to accomplish the purpose. It will be noted that all of the components thus described are not necessarily required to be within the scope of this invention, as simplified drive means may be incorporated with equal ease.

A forward thrust engine 56 is rotatably mounted at the rear of the vehicle to propel the craft forward. This engine 56 is also air cooled and includes all of the same accessories as described in the lift engine 34. This thrust engine 56 is pivotally mounted on the frame 24 in such a manner as to move from side to side by the use of a rotatable pedestal 66. This pedestal 66 is best illustrated in FIGS. 4 and 8 and has a platform on the top for receiving the engine 56 and a retained base attached to the body 20 on the bottom.

A forward thrust fan 68 is connected directly to the drive shaft of the thrust engine 56 or a gear box may be included at the interface for changing the fan speed. A protected orifice ring 70 is utilized around the periphery of the fan to maximize the air flow and provide safety protection from the moving blades of the fan 68. This orifice ring 70 is preferably attached to the top platform of the pedestal 66 and becomes a structural member thereof.

An aileron 72 having an aerodynamic shape is pivotally disposed directly behind the forward thrust fan 68 allowing the discharge air to directly impinge upon the exposed surface. When the aileron 72 is rotated, the air is directed in a controlled manner, either up or down, and the vehicle reacts in the opposed manner. This movement controls the pitch of the vehicle and allows the thrust fan 68 to remain in a horizontal plane simplifying the mounting.

Steering of the vehicle is controlled by a linkage, best illustrated in FIG. 9. A movable handlebar steering device 74 is mounted on the body 20 forward of the midsection and lifts up, or is pushed down, and is rotated side to side. Movable aileron linkage 76 connects the handlebar devide 74 to the aileron 72 providing horizontal orientation in response to lifting or dropping the handlebars 74, thereby controlling the desired pitch of the vehicle. This aileron linkage 76 may be rigid bars, tubes, rods, and the like, with pivotal clevises and yokes, or may utilize a combination of rigid members and cables with pulleys therebetween. The side to side direction of steering is controlled by a thrust fan linkage 78 that extends from the bottom of the handlebar steering device 74 to the thrust fan rotatable pedestal 66. The makeup of this linkage is the same as described above, with a crossover occurring in the horizontal run changing directional orientation for positive turning response from the handlebars 74. As the handlebars 74 are turned side to side, the thrust fan linkage 78 rotates the fan 68 in an arcuate vertical orientation controlling the direction of the fan discharge in an opposed manner, thereby steering the vehicle in the desired direction.

A plurality of seats 80 are attached to the top of the body 20 allowing the driver and an occupant to be seated thereon.

Figure 12:
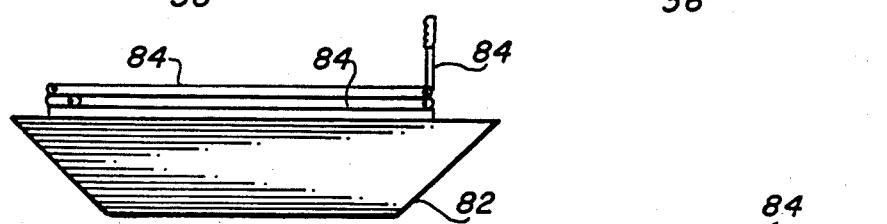
FIG. 12 is a view of one of the keels in the retracted mode completely removed from the invention for clarity.
Figure 13:
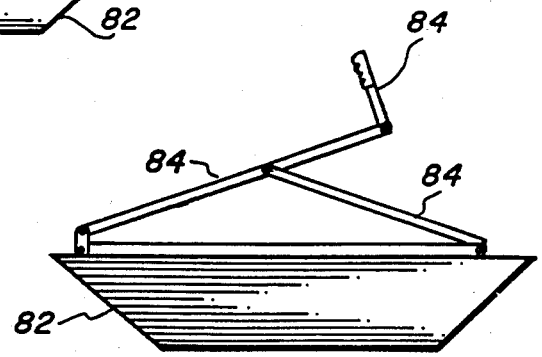
FIG. 13 is a view of one of the keels in the deployed or extended mode, as above.

A pair of movable keels 82 are positioned under the body 20 within the plenum area of the craft. A manual pivotal keel lever mechanism 84 is attached to each keel 82 providing vertical movement. Moving the lever mechanism 84 in a horizontal direction changes the orientation of the pivot points in scissor fashion allowing free movement up and down in an independent manner. This movement extends the keels 82, which is the optimum position for traveling on the water, decreasing the effective perimeter area, allowing greater lift to be provided to the vehicle in this mode of transportation. The keel 82 and lever mechanism 84 are pictorially illustrated completely removed from the vehicle in FIGS. 12 and 13 depicting this functional capability.

A pair of side wings 86 extend movably from each side of the vehicle body changing the perimeter area to clear irregular surfaces of the ground mass while the craft is in operation. Side wing positioning means 88 are mechanically linked to each wing 86 in the same manner as the keel lever mechanism 84, except in the horizontal direction. The operating mechanism of the positioning means 88 is located in the proximity of the drivers seat 80, allowing the wings 86 to be deployed by the operator of the vehicle while it is in motion.

A motor driven water pump 90 is located within the body 20 of the vehicle. The pump 90 contains an integral motor with the impeller connected directly upon the drive shaft and a surrounding housing. The motor operates on direct current electrical power generated by the lift engine 34 and is included in the storage battery 60 electrical system. A single inlet and a pair of outlet conduits extend beneath the body 20 and ingest water into the inlet of the pump 90 and discharge the pressurized fluid at high velocity in a jet fashion. This movement of water propels the vehicle while in the water at slow speeds and is used primarily for maneuvering and docking without starting the main engines or at an idle speed prior to lifting off.

A motor driven reversing fan 92 is mounted on the front of the vehicle and supplies an air flow to the bow. This air movement is to reverse the movement of the vehicle when the thrust fan 68 is not operating, or is used for braking while going down hill. This reverse thrust of air operates on a small scale, as does the thrust fan 68, except in an opposite direction. Power for this reversing fan 92 is supplied from the same source and in the same manner as the motor on the water pump 90.

A plurality of roll bars 94 are rigidly mounted to the frame 24 near the seats 80. These roll bars 94 are "U" shaped with a mounting plate on each end protecting the occupants if the vehicle is accidently rolled on to its top. The roll bars 94 are preferably fabricated of a round metal tube having the structural integrity to accommodate such an impact.

Each seat 80 is equipped with seat belts 96, which may include a harness. These seat belts 96 are anchored securely to the frame 24 and provide a restraining means to hold the occupants in their seats in the event of an accidental collision, a sharp turn, or an abrupt stop, etc.

A removable canopy 98 is attached to the vehicle on the top over the seats 80 resting upon the roll bars 94. This canopy 98 may be rigid, such as fabricated of fiberglass, or constructed of a resilient cloth material of a synthetic fiber, or the like. In any event, the canopy 98 is removably attached to the structure and functions to protect the occupants from the elements during all weather conditions.

A hinged lift fan cover 100 is positioned on top of the lift fan 36. This fan cover 100 is hinged in a foldable manner, and also at one edge attached to the body 20. The purpose of the cover is to provide a flat platform for standing on and working on top of the vehicle, particularly when it is reating upon the water. The cover 100 may be of any structural material, such as metal, fiberglass, or the like, as long as it possesses the structural integrity for the application. The cover 100 is shown folded in FIG. 4.

A parachute 102 is mounted on the top surface of the body 20 in back of the rear seat 80. The folded parachute 102 is intended for slowing the descent in the event that the vehicle accidently falls.

A deflector plate 104 is located under the bottom surface of the body 20 directly beneath the lift fan 36. This plate 104 is best illustrated in FIG. 7 and covers almost the interior surface. A even space between the outside edge of this plate 104 and the body 20 provides increased velocity of the discharge air thereby improving the lift effect. The plate 104 contains oval shaped edges 106 and is held in place with spacer brackets 108 as required to maintain the integrity of the structure.

The vehicle operates on the air cushion, or ground effect principle with the lift fans 36 drawing air in from the top side and delivering it into a plenum integral with the shell 26. The compressed gas, or ambient air, is discharged from around the bottom skirt 28 with an even escape velocity creating a lifting force. The plenum, or underside, of the crafts shell 26 in conjunction with the skirts 28 provides the inside surface area that is pressurized and inasmuch as the surface upon which it is resting is relatively solid, the gap or space therebetween becomes the boundary for the compressed gas creating the lift effect. Forward propulsion is provided by a separate thrust engine 56 and fan 68 giving direction to the craft. This propulsion and lift system allows the invention to travel over earth, sand, snow, and water, etc.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

We claim:

1. A pitch controlled ground effect self-propelled vehicle comprising:
   (a) a body having an aerodynamic shape and a pair of round orifices therethrough;
   (b) an internal combustion lift engine having necessary ancillary equipment for operation thereof, positioned within the centermost portion of said body supplying the main source of lift power;
   (c) a pair of lift fans positioned within said round orifices in the body furnishing a direct movement of air when rotated, creating a lift effect by pushing a pressurized curtain of air underneath said body forcing a separation of the vehicle from the surface upon which it is resting;
   (d) drive means dynamically connecting said engine to said fans in such a manner as to change the rotational force of the engine from a vertical direction to a horizontal direction while transmitting sufficient mechanical force to rotate said fans;
   (e) a forward thrust engine rotatably mounted to said body providing energy to propel the vehicle forward;
   (f) means to mount said thrust engine on said body while allowing side to side movement thereof;
   (g) a forward thrust fan disposed upon said forward thrust engine to provide a direct movement of air propelling the vehicle in a forward direction;
   (h) an aileron disposed directly behind said forward thrust fan providing stability and an angle of pitch to the vehicle by the horizontal position it maintains in respect to the thrust fan;
   (i) steering means connected to said forward thrust fan and aileron providing directional control of the vehicle by an operator;
   (j) a plurality of seats affixed on top of said body allowing the occupants to be seated thereon;
   (k) a pair of movable keels linkingly disposed beneath said body having the capabilities of being manually extended when the vehicle is traveling upon the waters surface decreasing the effective perimeter area allowing greater lift to be provided; and,
   (l) a pair of side wings extending movably from each side of the vehicle body changing the perimeter area to clear irregular surfaces of ground mass when the vehicle passes thereupon.

2. The apparatus as recited in claim 1 wherein said body further comprises:
   (a) a frame, having sufficient structural integrity to withstand the stresses of vehicle operation, providing a mounting structure for said engines and functional apparatus, also supporting an operator and passengers;
   (b) a shell attached to said frame encompassing the top outside area providing an air plenum and a protective enclosure thereupon;
   (c) a plurality of skirts projecting downwardly from said frame defining a boundary for the discharge of the air moved by said lift fan allowing the air to exert sufficient pressure upward to lift the vehicle from the surface;
   (d) a plurality of foam filled float chambers suspended by said frame having sufficient air space therein to provide floatation of the vehicle when resting upon a body of water; and,
   (e) a windshield attached to the body forward of said seats for protecting the driver of the vehicle while allowing clear visibility there-through.

3. The invention as recited in claim 1 further comprising:
   a fuel system for said lift engine having storage tanks and interconnecting piping attached directly to said body supplying liquid fuel as an energy source for said engine;
   an electrical control system for said lift engine including a storage battery, interconnecting wire conduit and switch gear for starting and stopping said engine; and,
   said lift engine is of the air cooled type having an internal fan to move air across extended surface areas within the engine envelope.

4. The invention as recited in claim 1 wherein said drive means further comprises:
   (a) a flywheel gear attached to the flywheel of said lift engine;
   (b) a worm gear with a first bevel gear on each end rotatably meshed with said flywheel gear changing the speed and rotational plane of said lift engine;
   (c) a set of second bevel gears each meshingly engaging said first bevel gear defining an opposed horizontal rotation of said drive means;
   (d) a pair of first sprockets, one attached upon each horizontally driven second bevel gear for connection thereof;
   (e) a pair of gear boxes mechanically linked to each lift fan having speed changing capabilities to furnish the optimum rotation to the fan;
   (f) a pair of second sprockets, one fastened to each gear box for connection thereof; and, (g) a pair of chains, each connecting the first sprockets to the second sprocket transmitting power from the lift engine within the centermost portion of the vehicle to the lift fans providing the motivating force for the ground effect system.

5. The invention as recited in claim 1 further comprising:
a fuel system for said forward thrust engine having storage tanks and interconnecting piping attached directly to said body supplying liquid fuel as an energy source for said engine; an electrical control system for said forward thrust engine including a storage battery, interconnecting wire conduit, and switch gear for starting and stopping said engine; and, said forward thrust engine being of the air cooled type having an internal fan to move air across extended surface areas within the engine envelope.

6. The invention as recited in claim 1 wherein said means to mount said thrust engine further comprises: a rotatable pedestal having a platform on the top for receiving the thrust engine, also a retained base on the bottom rotatably affixed to said body allowing axial movement of the thrust engine and thrust fan mounted thereupon.

7. The invention as recited in claim 1 wherein said steering means further comprises: a movable handlebar steering device mounted on said body in front of the occupants seat for directing the movement of the vehicle;
aileron directional control means having movable linkage between said handlebar and said aileron for positioning the aileron in a horizontal orientation in response to lifting or dropping the handlebar controlling the desired pitch of the vehicle as moving air is impinged upon the aerodynamic surface of the aileron by the thrust fan; and,
thrust fan directional means having movable linkage between said handlebar and said thrust fan for positioning the fan in an arcuate vertical orientation in response to turning the handlebar from side to side controlling the direction of the fan discharge in an opposed manner.

8. The invention as recited in claim 1 further comprising:
a manual pivotal keel lever mechanism attached to each keel in such a manner as to provide vertical movement thereupon by moving the lever in a horizontal direction changing the orientation of the pivot points in scissor fashion allowing free movement up and down as directed by each lever independent of the other.

9. The invention as recited in claim 1 further comprising:
side wing positioning means mechanically linked to each wing through the body terminating in the proximity of the occupants seat allowing the wings to be deployed by the operator while the vehicle is in motion.

10. The invention as recited in claim 1 further comprising:
a motor driven water pump within said body supplied by electrical power from said lift engine having an inlet and outlet extending beneath the body surface for propelling the vehicle in the water at low speeds for maneuvering and docking by ingesting water in the inlet of the pump and discharging the pressurized fluid at high velocity in a jet-like manner.

11. The invention as recited in claim 1 further comprising:
a motor driven reversing fan mounted in the front of the vehicle ahead of said lift fan driven by electrical energy from said lift engine ancillary equipment for reverse movement of the vehicle and braking in downhill operation by furnishing a reverse thrust of air in the same manner as said forward thrust fan, except in the opposite direction.

12. The invention as recited in claim 1 further comprising:
a plurality of roll bars rigidly mounted upon said body in the proximity of said seats in "U" shape attached on each end for protecting the occupants in the event the vehicle is accidently rolled upon its top by providing a structural member capable of withstanding the forces encountered in such an event.

13. The invention as recited in claim 1 further comprising:
a plurality of seat belts anchored solidly to said frame in the proximity of said seats providing an attaching means to restrain the occupants in their respective seats during vehicle movement and in the event of an accidental collision of the vehicle.

14. The invention as recited in claim 1 further comprising:
a removable canopy on top of the uppermost portion of said vehicle over said seats allowing the apparatus to operate in all weather conditions protecting the occupants from the elements.

15. The invention as recited in claim 1 further comprising:
a hinged lift fan cover rotatably positioned on top of said lift fan in a foldable manner for use when said vehicle is not in operation providing a flat platform for standing upon and working on the top of the vehicles body.

16. The invention as recited in claim 1 further comprising:
a parachute mounted on top of said body in back of the seats for slowing the descent in event that the vehicle accidently falls.

17. The invention as recited in claim 1 further comprising:
a deflector plate having a concave bottom surface and oval shaped edges with spacer brackets located within said body directly beneath said lift fans providing a diffused air flow path from said lift fans directing the air to the preferal area around the inside of said body at an increased velocity.

* * * * *